Figure 1:
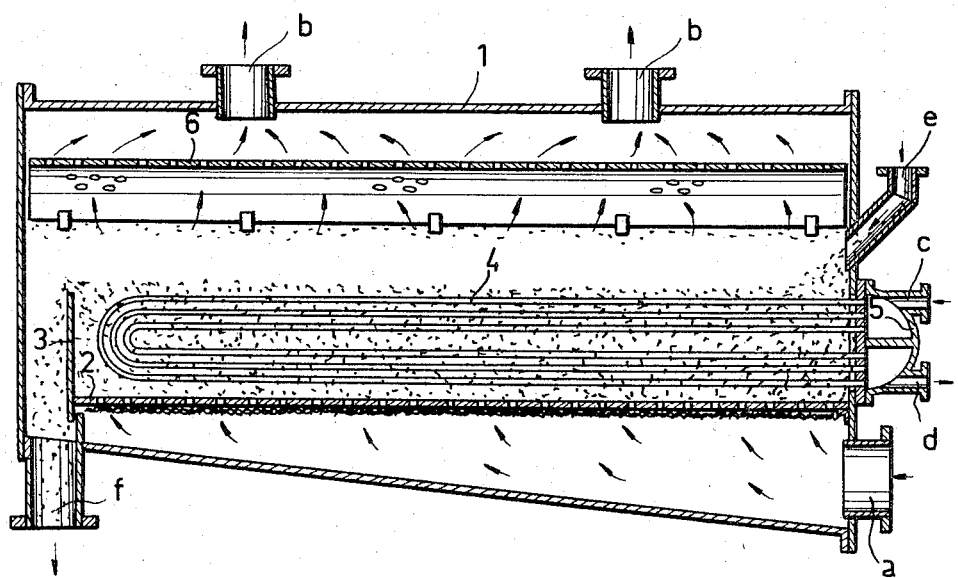

United States Patent [19]
Dumitru et al.

[11] 3,851,406
[45] Dec. 3, 1974

[54] FLUIDIZED-BED APPARATUS

[75] Inventors: Ion D. Dumitru; Victor A. Grigoras; Mircea Ioan T. Turtureanu; Doina Ecaterina G. Stanciu; Vasile V. Anescu, all of Bucharest, Romania

[73] Assignee: Ipran-Institutul de Proiectari Pentru Industria Chimica Anorganica Si A Ingrasamintelor, Bucharest, Romania

[22] Filed: Apr. 23, 1973

[21] Appl. No.: 353,772

[30] Foreign Application Priority Data
Apr. 24, 1972  Romania.............................. 70664

[52] U.S. Cl.................... 34/57 R, 165/104, 432/58, 23/288 S
[51] Int. Cl............................................ F26b 17/10
[58] Field of Search ...... 34/10, 57 R, 57 A; 432/15, 432/58; 165/104; 23/288 S; 208/163, 164

[56] References Cited
UNITED STATES PATENTS

| | | | |
|---|---|---|---|
| 2,470,395 | 5/1949 | Goyr............................ | 34/57 R X |
| 2,797,908 | 7/1957 | Zubrzycki.......................... | 34/57 A |
| 3,216,125 | 11/1965 | Dennert............................ | 34/57 R |
| 3,242,586 | 3/1966 | Peterson........................... | 34/57 A |
| 3,242,974 | 3/1966 | Goulounes...................... | 34/57 A X |
| 3,281,508 | 10/1966 | Goulounes...................... | 432/15 X |
| 3,436,837 | 4/1969 | Abelon et al................... | 34/57 A X |
| 3,514,868 | 6/1970 | Hoggarth.......................... | 34/57 A |
| 3,621,585 | 11/1971 | Robertson...................... | 34/57 A X |

*Primary Examiner*—William F. O'Dea
*Assistant Examiner*—William C. Anderson
*Attorney, Agent, or Firm*—Karl F. Ross; Herbert Dubno

[57] ABSTRACT

The invention relates to an apparatus for processing powder in a fluidized bed, with horizontal circulation and indirect thermal transfer elements, in which: the perforated inlet screen for the fluidizing agent has attached thereto a plurality of tissue (fabric) (in number and location as required for a good fluidization); the tubular transfer elements are horizontal, rectilinear or identically undulated in the space arranged in the flowing direction of the bed and over the entire length thereof (possibly divided for successive processing zones), in a plurality of horizontal rows offset from one row to an other; the uniformizing screen for the gas flow, at the upper part of the treatment space, is of a perforated sheet and is cylindrically vaulted, with its concavity downward and has holes over 30 to 40 percent of its total surface.

3 Claims, 2 Drawing Figures

FLUIDIZED-BED APPARATUS

The invention relates to an apparatus for processing powder in a fluidized bed, with horizontal circulation and with thermal transfer elements.

In processing the various powder materials, a final treatment stage is generally necessary. The process usually consists of heating, drying, cooling, mixing operations, or a combination thereof. Such operations are usually performed in rotary drum-type apparatus, conditioning cupboards, apparatus with fluidized bed, towers, apparatus with helical conveyer, etc.

The apparatus with operating fluidized bed, developed over the last time, have proved to have a superior performance, particularly due to the high thermal transfer, of their economicity and simplicity.

In the cases in which the thermal supply could not be achieved to the necessary extent by air or another gaseous fluidizing agent, the apparatuses were provided with indirect thermal transfer elements, located in the fluidizing space. The fluidizing is equipped, at its lower part, with a screen through which the fluidizing agent for the powder material is blown in, the powder being introduced through a lateral opening above the screen.

These screens are usually porous plates, or perforated sheets, which are adapted, with difficulty, to the varying fluidizing conditions therein; they do not offer convenient adjustability to ensure good fluidization. In fluidizing apparatus, operating in an open system, usually vertical, the fluidized bed is deprived of circulation; it overflows the processed materials continuously, laterally, at its upper part, and the fluidizing agent is withdrawn, at the upper part of the apparatus; in such apparatus, there exists, above the fluidized bed, a free space, above which there are provided screens for uniformizing the flow of the evacuated gases; these screens, however, become loaded at their backside with entrained powdery material which is still carried away which obturates the holes and disturb the process.

In another vertical apparatus, the vertical bed circulates in the upward direction, in the same way as the fluidizing agent, being removed together with the fluidizing agent at the upper part of the apparatus. A higher thermal efficiency and wider use ranges, as for instance in chemical reactions, can be obtained with vertical, multistage apparatus, with downward circulation of the powder. All these apparatuses, with bed circulation, are more complicated, have great heights and require total or partial separation of the powder from the fluidizing gas externally of the apparatus.

Some of the vertical apparatuses were provided in the fluidizing space with elements for indirect thermal transfer, in the form of winding tubes or vertical tubes with collectors, or horizontal tubes located in the upper zone only or in a number of stages multistaged.

There is also known a type of fluidizing apparatus with horizontal circulation of the powdery material, in which the fluidizing agent circulates crosswise, in the upward direction. For such apparatus it has also to provide proposed thermal transfer elements in the fluidizing space. This apparatus may be equipped with a single row of tubes, distributed in the circulating direction of the fluidized bed; the tubes are fastened to respective vertical walls, extending up to the blowing-in screen; these walls divide the lower zone of the fluidized bed, for a better uniformizing of fluidization. Other apparatus with horizontal circulation of the fluidized bed, is equipped, in the bed, with even, narrow elements for indirect thermal transfer, arranged vertically over the whole length of the bed; the even elements are parallel to the flow direction; such apparatuses are used for a single physical operation over the entire circulation length of the bed, or for two directly connected operations, as, for instance, heating and drying.

The present invention has as its object the provision of an apparatus for processing powder in a fluidized bed, with horizontal circulation which represents an improvement over the described system. The apparatus comprises, a screen, through which the fluidizing agent is blown in transversely, provided in the fluidizing space tubular indirect thermal transfer elements in the fluidizing space, and, above the space over the bed is provided with a screen for uniformizing the flow which are then discharged through outlets at the upper part of the apparatus; the invention brings about homogeneous fluidization, in both the vertical and in the flow direction of the bed, achieves a higher thermal transfer and allows the carrying out, during the processing, of several operations; physical, mechanical, as, for instance mixing, and even chemical reactions.

In the apparatus according to the invention, the blowing-in screen of the fluidizing agent is constituted of a plurality of filtering tissues (fabric or layers) clinging to a perforated sheet. The tissues and the sheet are sustained by a common frame that can be slidably removed from the apparatus. The filtering tissues are constituted of glass yarn or of plastics, known for their satisfactory resistance to the operating medium and its temperature. The perforated sheet clinging to the filtering tissues has uniformly distributed perforations, through which pass the partial flows of the fluidizing agent. The size of the sheet perforations is thus selected that, under the operating conditions with the filter layer or layers in place, it will provide the optimum pressure loss for the process. The variable number of filtering tissues, their setting and the perforated sheet with holes of certain diameters and distribution, are selected in such a way that the pressure loss of the fluidizing agent, across the blowing-in screen, should represent 40–50 percent of the total pressure loss of the fluidizing agent in the apparatus.

According to the invention, the tubular elements for thermal transfer of the apparatus are extended, in the bed circulating direction, over the entire working zone of an operation, and are arranged in its cross section, as well as in its various, successive cross-sections, on several horizontal rows, being from one row to another. Under these circumstances, the tubes of the elements can be rectilinear or identically undulated in space.

At the upper part of the space above the bed, the uniformizing screen is provided in vaulted form, with the concavity downward and the crest in the circulation direction of the fluidized bed; The screen extends up to a small distance from the lateral walls of the apparatus, i.e., has its lateral edges spaced from these walls; through the space left we ensured to return to the fluidized bed of the particles that are carried away by the flow of evacuated gases and which could collect on the backside of the uniformizing screen.

The uniformizing screen, also of perforated sheet, has holes whose total area constitutes 30 to 40 percent of the total surface of the screen.

The apparatus for processing powdery materials in fluidized bed, according to the invention, can be set for several operations on the powder, carried out over the length, of the apparatus in successive zones; these may be, for instance, heating, drying, cooling, mixing, or chemical reactions with other substances, introduced separately at the input end of the apparatus. According to the requirements of the treatment effected, some zones may be equipped with elements for thermal transfer, but without the use of an active thermal transfer agent therein, or can be free from thermal transfer elements when such a thermal transfer is not needed, or when the heat supply is provided by the fluidizing agent and the conditions of a homogeneous fluidization can be ensured by this agent. In such cases, the inlet chamber itself may be divided correspondingly by walls, in order to ensure various blowing-in and fluidizing conditions.

By extending the thermal transfer elements over the entire operating zone of the apparatus and by offsetting them in the successive cross-sections of the working zone, an improved homogenization of the fluidized bed is obtained by breaking up the gas bubbles, thereby intensifying the heat transfer, as against the usual heat transfer between the particles and the thermal transfer elements.

It has now been ascertained experimentally and proved by calculation that the presence of the horizontal and offset tubular elements, in the fluidizing space, breaks up the above-mentioned bubbles more actively and further raises the bed homogeneity, so that the homogeneity index increases by 50 to 70 percent as compared to the bed without any heat-transfer elements or by 30 to 40 percent as against the case with nonoffset elements. This is due to the fact that the ascendent currents in the bed, are subjected, in passing through the elements, to a turbulent circulation regime, that is, accentuated through the shifting of the thermal transfer elements. The presence of the elements undulation, over their length, raises the efficiency of the turbulent flow and of the homogeneity in vertical plates, transverse to the flow direction, which increases the homogeneity of the residence time and facilitates and increases the efficiency of the use of the apparatus in different successive operations.

By constituting the screen for blowing-in fluidizing agent of a plurality of filtering tissues, with a clinging perforated sheet, we can vary the number of the tissues and the setting of their stitches, so that, in combination with the diameter and number of holes adopted for the perforated sheet, the loss in pressure, established for the fluidizing agent, may be easily obtained, thereby ensuring good fluidization under economical conditions. Thus, the variation in the perforations of the inlet screen in the flow direction of the fluidized bed is feasible, which contributes considerably to a closer accommodation of the screen to the requirements of a good fluidization.

By adopting the vaulted form of the screen for uniformizing the flow of discharged gases, the gas circulation in the allaying space above the bed is homogeneized and the particles carried away by the evacuated gases and deposited on its backside may slide on the vaulted surface, as mentioned before, and return to the fluidized bed through the narrow space between the edges of this screen and the lateral walls of the apparatus.

Figure 2:
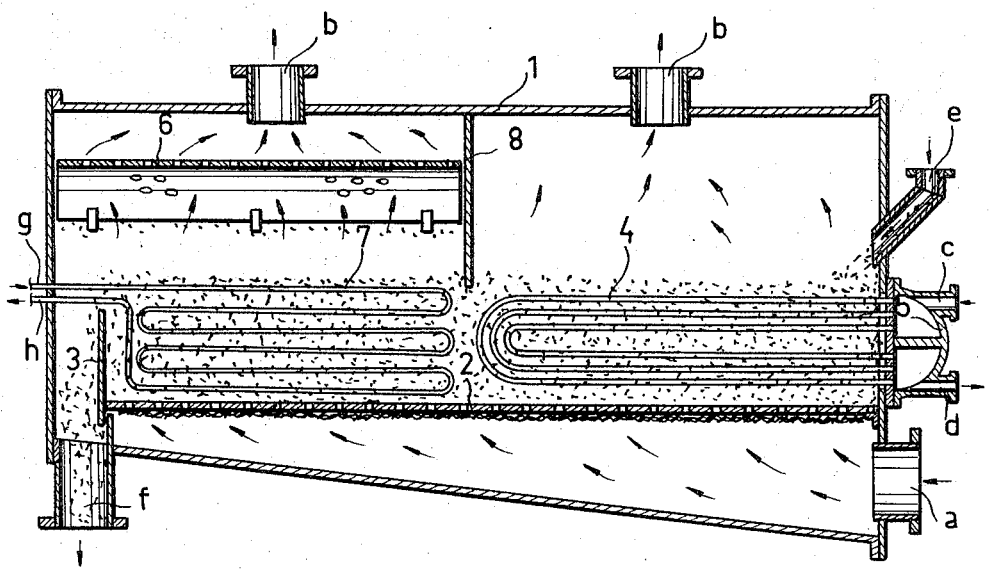

As a consequence to the improvement of the thermal transfer, under the shown conditions, in the horizontal apparatus, in which the circulation nevertheless occurs at relatively small speeds, the apparatus may have a larger width of the bed, so that the processing of a certain mass of materials is fulfilled with a smaller length of the apparatus. It thus becomes possible to carry out, along the apparatus, several different processes, the apparatus nevertheless having a convenient length. Considering also the the increased homogeneity of the bed in its cross-sections, the transition from one process to another is done without difficulties, even without the presence of intermediate overflow weirs. Two embodiments of the invention are described below with reference to the accompanying drawing in which:

FIG. 1 is a schematic longitudinal section, in a vertical plane, through the apparatus of a first embodiment; and FIG. 2 is a schematic longitudinal section, in a vertical plane, through the apparatus of a second embodiment.

Example 1. An apparatus with fluidized bed, for drying and heating to 150° C of powered calcium carbonate, resulting from precipitation, with a moisture content of a maximum of about 1 percent and with a granulation of 0.16 to 0.05 mm. The material results as a waste from other processes; the carbonate is recovered in a dried state and heated to 150° C.

The apparatus comprises a single operating zone, according to FIG. 1.

The apparatus consists of a horizontal parallelepiped chamber, separated, toward the lower part, by the inlet screen 2; at the end of this screen is located the overflow weir 3, by which the height of the fluidized bed is adjusted and, thereby, the residence time of the material in the apparatus. Through the input end of the apparatus is introduced the thermal transfer elements 4, rectilinear, parallel and located shifted in a cross plane; at their end, the lid 5 delimits the divided input output chamber of the heating agent. Above the space over the bed is located the uniformizing screen 6, vaulted, with the concavity downward, of perforated sheet; its lateral borders are kept at small distance from the lateral walls of the apparatus. Through fitting $a$ is introduced air, as the fluidizing agent, which is evacuated through fittings $b$. The fitting $c$, for the entry of the heating agent (medium pressure steam), as well as the fitting $d$, for the removal of the condensated water, communicate with the thermal transfer elements. The powdery calcium carbonate is introduced into the apparatus through the fitting $e$ with constant flow-rate and is discharged through fitting $f$.

The inlet screen 2 is formed of a sheet with round perforations, uniformly distributed, which clings to three rows of filtering tissues of glass yarn. The air flow is heated by the thermal transfer elements and fluidizes the calcium carbonate particles, after which it traverses the space above the bed, wherein the particles are separated substantially, passes through the uniformizing screen 6 and is evacuated through sockets $b$. The uniformizing screen is not clogged by the deposits.

The pressure loss in the blowing-in screen corresponds to 40 to 50 percent of the total pressure loss in the apparatus, dependent on the effective granulation, in the said range. The apparatus performs thermal loads that reach values of inlet 100,000 kcal/m² or blow screen area, in the temperature range of the apparatus as per the example.

Example 2. An apparatus with fluidized bed for drying and cooling of the ammonium sulphate crystals, resulted from centrifuging, with a moisture of 2 percent and a medium granulation of 0.8 mm. The apparatus comprises two operating zones, corresponding to the two operations of drying and cooling.

From constructive viewpoint, the apparatus is similar to that of FIG. 1, in all parts corresponding to the numerical references 1 – 6 and to the letter references $a - f$.

The drying takes place in the first zone, attended by the tubular elements of thermal transfer 4, heated by steam. The tubular elements of thermal transfer 7, from the cooling zone, are located in continuation of the tubular beam 4, having the frontal fittings for the introduction of the cooling agent $g$ and for its removal $h$. A transverse wall 8 divides the space above the bed transversally, corresponding to the two zones. It allows the omission of the uniformizing screen in the drying zone; it is thus effected, through fitting $e$, a recycling of the material carried away from the apparatus, beside the fresh ammonium sulphate. The ammonium sulphate crystals are removed through fitting $f$, at a temperature of about 40° C. Due to the use of the tubular transfer elements, in the two zones of the fluidized bed, the surface of the blowing-in screen, and, correspondingly, the surface occupied by the apparauts, decreases by above 40 percent.

What is claimed is:

1. An apparatus for the treatment of a powder comprising:
   housing means defining a fluidized bed chamber elongated horizontally and formed at one end with an inlet for the material to be processed and at the opposite end with an outlet for powder whereby said material traverses said chamber generally horizontally;
   means forming a fluidizing-gas space below said chamber;
   a perforated sheet communication in between said space and the bottom of said chamber for admitting fluidizing gas to said chamber to fluidize a bed of said material therein, said chamber having a free space above said bed;
   at least one filter sheet of fibrous material clinging to said perforated sheet and controlling the flow of fluidizing gas through said perforated sheet into said chamber, said chamber having a pair of lateral walls extending in the longitudinal direction.
   a downwardly concave vaulted perforated plate in said open space above said bed, said perforated plate permitting the discharge of gas from said chamber and having longitudinal edges spaced from said lateral walls whereby particles deposited upon the upper surface of said perforated plate fall between said edges and said lateral walls into said fluidized bed;
   a plurality of tubular heat-transfer elements having mutually parallel spaced apart stretches extending longitudinally into said chamber from at least one end thereof within said bed, said elements being spaced across the entire cross section of said bed in a plurality of horizontal rows offset from one row to another; and
   means for feeding a heat transfer fluid to and removing heat transfer fluid from said elements.

2. The apparatus defined in claim 1 wherein a respective set of such elements extends into said chamber from each end thereof over respective zones of said bed, said perforated plate and overlying only one of said zones.

3. The apparatus defined in claim 1 wherein said perforated plate has openings constituting 30 to 40 percent of the total area of said perforated plate.

* * * * *